(12) United States Patent
Mathisen et al.

(10) Patent No.: US 8,491,953 B2
(45) Date of Patent: Jul. 23, 2013

(54) FOOD SUPPLEMENT CONTAINING FISH OIL

(75) Inventors: Janne Sande Mathisen, Oslo (NO); Henrik Mathisen, Oslo (NO)

(73) Assignee: Smartfish AS, Oslo (NO)

( * ) Notice: Subject to any disclaimer, the term of this patent is extended or adjusted under 35 U.S.C. 154(b) by 1126 days.

(21) Appl. No.: 11/665,994

(22) PCT Filed: Oct. 21, 2005

(86) PCT No.: PCT/NO2005/000399
§ 371 (c)(1),
(2), (4) Date: Apr. 23, 2007

(87) PCT Pub. No.: WO2006/043830
PCT Pub. Date: Apr. 27, 2006

(65) Prior Publication Data
US 2009/0074933 A1    Mar. 19, 2009

(30) Foreign Application Priority Data
Oct. 22, 2004   (NO) .................................. 20044542

(51) Int. Cl.
*A23D 7/00*    (2006.01)
(52) U.S. Cl.
USPC ........................... 426/613; 426/602; 426/604
(58) Field of Classification Search
USPC ......................................... 426/613, 602–604
See application file for complete search history.

(56) References Cited

U.S. PATENT DOCUMENTS

| | | | | |
|---|---|---|---|---|
| 4,461,777 A * | 7/1984 | Murase et al. | 426/330.6 |
| 4,883,681 A | 11/1989 | Ernsting | 426/573 |
| 4,961,939 A * | 10/1990 | Antrim et al. | 426/61 |
| 4,963,380 A * | 10/1990 | Schroeder et al. | 426/330.3 |
| 4,963,385 A * | 10/1990 | Antrim et al. | 426/602 |
| 5,346,709 A | 9/1994 | Myhre | 426/111 |
| 5,837,308 A * | 11/1998 | Campbell et al. | 426/604 |
| 5,958,498 A | 9/1999 | Trueck et al. | 426/605 |
| 5,976,587 A * | 11/1999 | Yamauchi et al. | 426/112 |
| 5,976,606 A | 11/1999 | Koga et al. | 426/634 |
| 6,103,755 A | 8/2000 | Bumann | 514/458 |
| 6,231,913 B1 * | 5/2001 | Schwimmer et al. | 426/605 |
| 7,041,324 B2 * | 5/2006 | Myhre | 426/72 |
| 7,182,971 B2 | 2/2007 | Takase et al. | 426/601 |
| 7,229,658 B1 * | 6/2007 | Inoue et al. | 426/548 |
| 7,718,709 B2 | 5/2010 | Ishikawa et al. | 516/73 |
| 2002/0058064 A1 | 5/2002 | Opheim | 424/456 |
| 2003/0185960 A1 * | 10/2003 | Augustin et al. | 426/602 |
| 2008/0138493 A1 | 6/2008 | van Seeventer et al. | 426/609 |

FOREIGN PATENT DOCUMENTS

| | | |
|---|---|---|
| CN | 1103557 | 6/1995 |
| EP | 0293980 | 12/1988 |
| EP | 0 336 662 A2 | 10/1989 |
| EP | 0788747 B1 | 5/2003 |
| EP | 1616486 | 1/2006 |
| GB | 2 280 449 A | 2/1995 |
| JP | 56-21552 | 2/1981 |
| JP | 5-500606 | 2/1993 |
| JP | 7-107907 | 4/1995 |
| JP | 10201417 | 8/1998 |
| JP | 2003-160794 | 6/2003 |
| JP | 2004-248593 | 9/2004 |
| NO | 970254 | 1/1997 |
| WO | WO 98/47376 | 10/1998 |
| WO | WO 01/47377 A2 | 7/2001 |
| WO | WO 03/056939 A1 | 7/2003 |
| WO | 03/105606 | 12/2003 |
| WO | 2004/003119 | 1/2004 |
| WO | WO 2004/075647 A1 | 9/2004 |
| WO | WO 2005/120174 A2 | 12/2005 |

OTHER PUBLICATIONS

Kolanowski W. et al., "Possibilities of Fish Oil Application for Food Products Enrichment with .Omega.-3 PUFA," International Journal of Food Sciences and Nutrition, 50(1), 39-49 (1999).-Abstract.
Pharmalogica, Jun. 2004: Smartfish available at Harrods, http://www.pharmalogica.com/newsart_details.asp?step=1&id=1&id=23& pid=23.
Absolute Organix, 2005, "Smartfish is the Best Children's Supplement for Omega 3s," pp. 1-5, http://www.absoluteorganix.com.za/smartfish.htm.
Ferragut, V., et al., "Stability and Preservation of Sauce Emulsions of Low Oil Content," *Alimentaria*, No. 243, pp. 67-69 (1993) (English Abstract only).

* cited by examiner

*Primary Examiner* — Carolyn Paden
(74) *Attorney, Agent, or Firm* — Fitzpatrick, Cella, Harper & Scinto

(57) ABSTRACT

A food supplement containing fish oil is disclosed having a stable fish oil emulsion for production of a stable, healthy and user-friendly product.

10 Claims, No Drawings

FOOD SUPPLEMENT CONTAINING FISH OIL

FIELD OF INVENTION

The present invention relates to a food supplement containing fish oil and the preparation thereof.

DESCRIPTION OF PRIOR ART

Fatty acids are the building blocks of dietary fats. The human body stores such dietary fats substantially in the form of triglycerides. Triglycerides containing omega-3 fatty acids are mainly found in fish.

The omega-3 fatty acids are essential to life at any stage, even before birth. They are essential building blocks of the membrane of every cell in the body and their presence are a necessity for maintaining adequate cell membrane. They are also used in the regulation of most biological functions, including those of the cardiovascular, reproductive, immune and nervous systems.

The nutritional value of omega-3 for humans is well known and recognized by scientists and medical skilled persons all over the world. Several studies have been conducted within the field and significant benefits have been revealed on omega-3 in relation to the immune system, on supporting brain development and nervous system. Other studies support benefits of omega-3 intake when suffering from asthma or eczema. There is at present focus on the role of Omega 3 for children suffering from ADHD or other concentration problems.

The typical diet today gives a lack of omega-3. The Health authorities in Norway, Mattilsynet, are now actively advising the public to eat fish for dinner 4 times a week. This will not be a possible/or desired option by most families. This invention makes it possible to have a daily intake of omega-3 at a recommended level and to consume this without any problems of fishy taste, smell or dreaded aftertaste.

From early on, the source of omega 3 has been cod liver oil manufactured as liquids. Cod liver oil possesses a characteristic, not very pleasant flavor and taste, and a strong and persistent aftertaste. Many attempts have been made to overcome these challenges and to provide a cod liver preparation satisfactory to the consumer.

Both the stability and the palatability objects of marine oil preparations are related to the oxidation of marine oils, thus attempts to improve such preparations are focused on different ways of reducing or completely inhibiting the oxidation.

EP0493439 by Scanhall AS, describes a marine oil preparation containing 66-88% by weight of marine oil as a pasty emulsion. The preparation is emulsified with egg yolk, and commonly used antioxidants and preservatives are further ingredients. Additionally, the environment is maintained free of oxygen during processing and packaging.

Egg yolk proteins contain a significant amount of metal ions, such as iron. By using egg yolk as an emulsifier, metal ions are introduced to the preparation which will facilitate the oxidation process of the fatty acid. Additionally egg yolk proteins are potent antigens and may cause allergic reactions in humans suffering from or susceptible to such disorders.

Working with marine oil preparations shows that it is extremely difficult to prevent the oxidation of fatty acids. Event thought the processing and storage are conducted in an inert atmosphere, and the product are filled on air tight dose units, it has not been possible to prevent the oxidation completely and to offer a product where the fishy taste is eliminated or fully masked and the unpleasant aftertaste is no longer present.

Thus, there is still a need for a new fish oil preparation where the oxidation of the fish oil is further reduced, revealing a more stable, healthier and user-friendly product.

SUMMARY OF THE INVENTION

The present invention provides a new combination of key ingredients which makes it possible to produce stable fish oil emulsion where the oxidation of the fish oil is further reduced, revealing a more stable, healthier and user-friendly product. Said new combination of key ingredients is processed to a stable creamy palatable emulsion. Thus the consumer is offered a new composition including fish oil and omega-3 fatty acids without any fishy taste or after taste.

Further the present invention found that a fish oil emulsion should not be treated in the same way as an emulsion containing mainly vegetable oil, e.g. mayonnaise. Attempts have been made to convert commonly available food products such as mayonnaise and dressings to functional foods by adding for instance marine oil (omega-3 fatty acids) without success. This is due to the fact that the fish oil is much easier oxidized by the present oxidizing agents than vegetable oils.

The present invention provides a new composition of key ingredients which makes it possible to produce a fish oil emulsion, strongly prevented from oxidation.

The present invention provides standard requirements necessary for the ingredients and a method in order to prevent the fish oil from oxidizing during production, packaging, storage, and distribution, and later when used by the consumer.

The present invention provides a creamy emulsion offered in daily dose units, preferentially air tight plastic sachets.

DETAILED DESCRIPTION OF THE INVENTION

The present invention provides a novel food supplement comprising a fish oil emulsion. Said food supplement has an improved stability, less contents of preservatives and a pleasant taste and aftertaste. The novel food supplement according to the invention is preferentially provided in single dose units or metered multiple dose units.

One object of the present invention is to provide a stable palatable creamy food supplement. The term palatable is herein defined as a food supplement with a pleasant flavor, taste and aftertaste. The content of fish oil in said supplement is from 25 to 55% in an oil-in-water emulsion.

A further object of the present invention is to provide a stable food supplement wherein the oxidizing processes have been lowered to a minimum.

A further object of the present invention is to provide a food supplement avoiding the use of egg yolk. Egg yolk proteins contain a significant amount of metal ions, such as iron. By avoiding using egg yolk as an emulsifier, these metal ions are not introduced to the preparation and the oxidation processes of the fatty acids are reduced. Additionally egg yolk proteins are potent antigens and may cause allergic reactions in humans suffering from or susceptible to such disorders.

A further object of the present invention is to provide a food supplement in daily dose units containing the recommended daily dosage of omega-3 fatty acid. The daily dose units may be in the form of a sachet or a tube or any air tight container containing the recommended daily dose. Alternatively, the air tight container may contain apportioned multiple doses in a metered container. Yet another aspect of the present invention is to provide the supplement daily dose sachets particularly suited for ingestion by children.

Yet another object of the present invention is to provide a food supplement reducing the contents of preservatives to a minimum. When preparing fish oil emulsions it is necessary to add preservatives to achieve a product with adequate stability. Up to now a combination of different preservatives has been used in amounts up to 5% by weight of the preparation. The present invention provides a composition wherein the amount of preservatives is reduced to 0.1% by weight of the preparation.

Yet another object of the present invention is to provide a food supplement wherein sodium benzoate is avoided. A commonly used preservative is sodium benzoate, which now a days are known to have a number of undesirable effects. In fact, sodium benzoate is no longer permitted in Japan as food additive. The present invention provides a food supplement wherein potassium sorbate, i.e. the potassium salt of the naturally occurring nutrient sorbic acid, replaces sodium benzoate.

Yet another object of the present invention is to provide a food supplement with an improved pH profile. By replacing egg yolk with milk solids and increasing the water content significantly (from 10% to 35-55%) the pH is reduced from pH 6-7 to pH of about 4. This makes it possible to replace sodium benzoate with potassium sorbate. The reduced pH of the composition is favorable with respect to stability, e.g., inhibition of microbial growth.

Yet another object of the present invention is to replace the previously used sweetener with xylitol. Xylitol is a natural carbohydrate having 40% less calories that sugar and is safe both for hypoglycemic and diabetic individuals, and has beneficial effects on dental health.

These and further objects are achieved by the present invention.

Thus, the present invention provides a novel food supplement, comprising 25-55% fish oil in a creamy oil-in-water emulsion, milk solids, sweetener, flavoring agents, antioxidants and preservatives.

One preferred embodiment of the present invention provides a novel food supplement, wherein said milk solids is Grindsted FF 1125.

Another preferred embodiment of the present invention provides a novel food supplement, wherein said preservative is potassium sorbate.

Another preferred embodiment of the present invention provides a novel food supplement, wherein pH is about 4.

Another preferred embodiment of the present invention provides a novel food supplement, wherein said sweetener is xylitol.

A further preferred embodiment of the present invention provides a novel food supplement filled in daily dose units, preferentially air tight plastic sachets.

A further preferred embodiment of the present invention provides a novel food supplement, wherein the food supplement is filled in multi dose units, preferentially air tight metered tubes.

A further preferred embodiment of the present invention provides a novel food supplement, wherein the supplement is intended for children.

One especially preferred embodiment according to the present invention is a food supplement, comprising

| | |
|---|---|
| Fish oil | 55% |
| Water | 35.20% |
| Xylitol | 4.50% |
| Potassium Sorbate | 0.10% |
| Grindsted FF 1125 | 4% |
| Lemon Flavoring | 0.60% |
| Guardian Rosemary Extract | 0.20% |
| Citric acid | 0.18% |
| Orange Flavoring T14 366 | 0.10% |
| Grindox Toco 50 Antioxidant | 0.08% |

A further preferred embodiment according to the present invention is a food supplement, comprising 35% fish oil and 54.20% water, further ingredients as defined above.

Additionally, the present invention provides a process for the preparation of a food supplement comprising forming a creamy oil-in-water emulsion comprising 25-55% fish oil under inert atmosphere and filling said oil-in-water emulsion onto a unit dosage container of an air-tight material.

In summary, a novel food supplement comprising a creamy fish oil emulsion and a process for preparation thereof is provided. Said food supplement has an improved stability, less contents of preservatives and a pleasant taste and after taste is provided by the present invention. The novel food supplement according to the invention is preferentially provided in single dose units or metered multiple dose units.

The present invention will now be further described with reference to the following, non-limiting examples.

EMBODIMENTS

Example 1

| | |
|---|---|
| Fish oil | 55% |
| Water | 35.20% |
| Xylitol | 4.50% |
| Potassium Sorbate | 0.10% |
| Grindsted FF 1125 | 4% |
| Lemon Flavoring | 0.60% |
| Guardian Rosemary Extract | 0.20% |
| Citric acid | 0.18% |
| Orange Flavoring T14 366 | 0.10% |
| Grindox Toco 50 Antioxidant | 0.08% |
| Total | 100% |

Example 2

| | |
|---|---|
| Fish oil | 35% |
| Water | 54.20% |
| Xylitol | 4.50% |
| Potassium Sorbate | 0.10% |
| Grindsted FF 1125 | 5% |
| Lemon Flavoring T10181 | 0.60% |
| Guardian Rosemary Extract | 0.20% |
| Citric acid | 0.18% |
| Orange Flavoring T14366 | 0.10% |
| Grindox Toco 50 Antioxidant | 0.08% |
| Total | 100% |

The emulsions are prepared by standard techniques known to persons skilled in the art and all ingredients are commercially available*. The processing and packaging are conducted under an inert atmosphere at a temperature between 0-10° C. The emulsions are filled onto daily dosage sachets ready to be used. Sachets containing different amounts of fatty acids adjusted to the recommended daily dose of adults, children and infant are possible. The product is stored at a temperature of 0-10° C.

*Declaration;
GUARDIAN™ Rosemary Extract 201 (natural rosemary extract)
GRINDOX™ TOCO 50 Antioxidant (E 306, rapeseed oil)
Lemon Flavouring T10181 (NI, liquid)
Orange Flavouring T14366 (NI, liquid)
GRINDSTED® FF 1125 Stabiliser System (E 1422, milk solids, E 1442, E 415)

The ingredients mentioned above are produced by Danisco A/S, Langebrogade 1, DK-1001 Copenhagen.

The invention claimed is:

1. A food supplement consisting essentially of 25-55% by weight fish oil in a creamy oil-in-water emulsion, milk solids, sweetener, flavoring agents, antioxidant, preservative and water in an amount of 35-55% by weight, wherein the milk solids are an emulsifier that provides a stable oil-in-water emulsion and are present in an amount of about 4 to about 5 percent by weight of the supplement and the preservative is present in an amount to inhibit microbial growth.

2. The food supplement according to claim 1, wherein said preservative is potassium sorbate.

3. The food supplement according to claim 1, wherein pH is about 4.

4. The food supplement according to claim 1, wherein said sweetener is xylitol.

5. The food supplement according to claim 1, wherein the food supplement is filled in daily dose units in air tight plastic sachets.

6. The food supplement according to claim 1, wherein the food supplement is filled in multi dose units-in air tight metered tubes.

7. The food supplement according to claim 1, wherein the supplement is intended for children.

8. The food supplement according to claim 1, comprising 55% Fish oil; 35.20% Water; 4.50% Xylitol; 0.10% Potassium Sorbate; 4% milk solids; 0.60% Lemon Flavoring; 0.20% natural rosemary extract; 0.18% Citric acid; 0.10% Orange Flavoring; and 0.08% rapeseed oil.

9. The food supplement according to claim 1, wherein the food supplement is free of egg yolk.

10. The food supplement according to claim 1, wherein the preservative is in an amount of 0.1% by weight.

* * * * *